July 11, 1950 — F. G. MANSON — 2,514,656
SELF-LOCKING SNAP HOOK
Filed Sept. 22, 1943
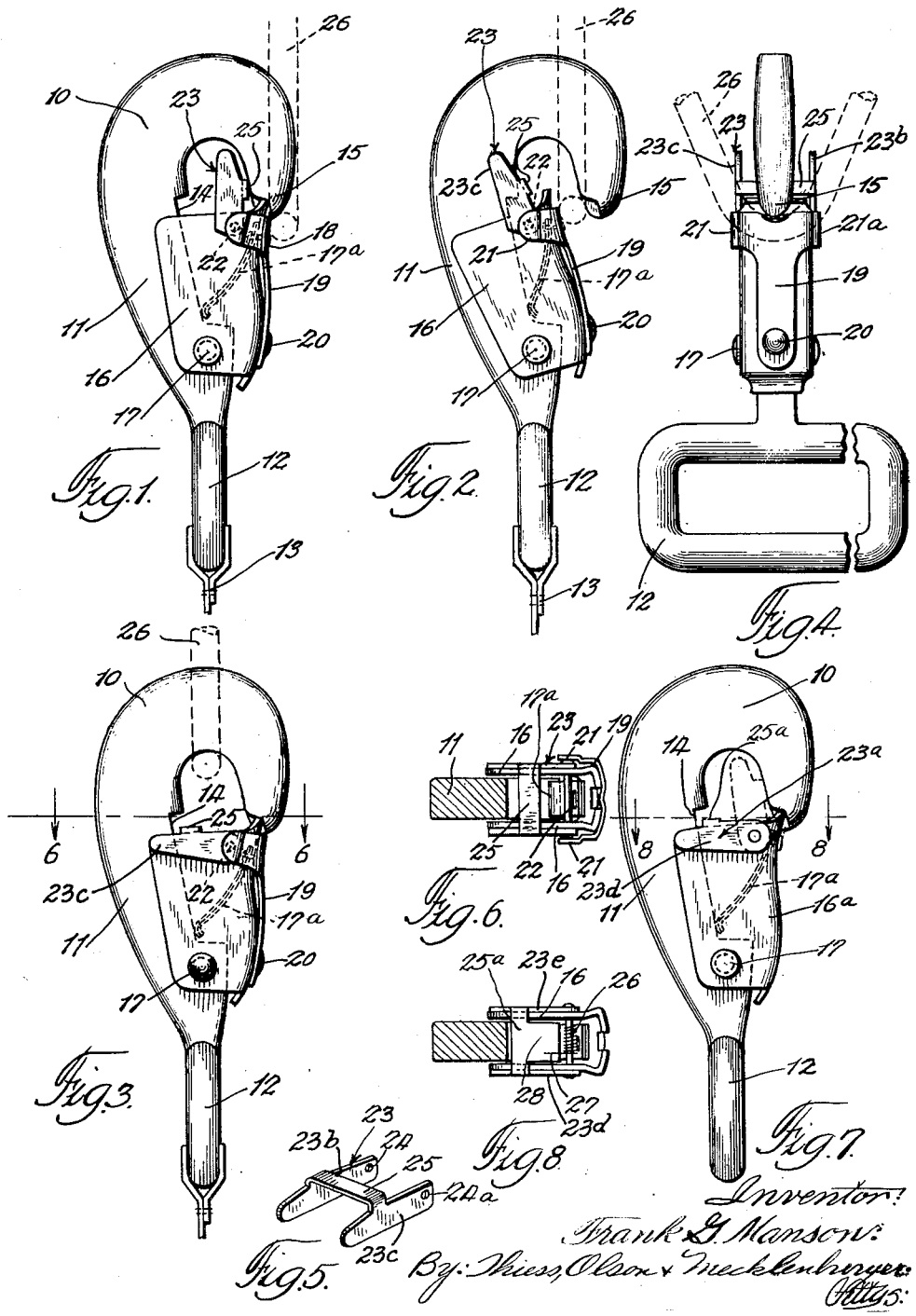

Patented July 11, 1950

2,514,656

UNITED STATES PATENT OFFICE 2,514,656

SELF-LOCKING SNAP HOOK

Frank G. Manson, Chicago, Ill.

Application September 22, 1943, Serial No. 503,343

10 Claims. (Cl. 24—241)

My invention relates to a quick-acting self-locking snap, and it has special reference to a species of snaps that is employed for expeditiously and securely affixing a length of webbing, strap, rope, or the like that is secured to the snap, to another attaching device such as a ring, rod, cable, or similar device.

Snap devices of the general character to which my invention pertains comprise a hook and accessory elements, usually including a spring, that retain the hook in engagement with the attaching device until the snap is manually released. However, my instant snap embodies an automatic feature that renders the snap self-locking as soon as it engages the attaching device to which the snap is secured. This automatic feature serves as a positive mechanical obstruction to the release of the snap from the attaching device, and must be manually manipulated before the attaching device can be disengaged from the snap.

One object of my invention, therefore, is to provide a snap comprising a hook which, when engaged with a co-operating attaching device, becomes self-locking with a snap action, and the co-action between the attaching device and the snap forces a locking member into positive mechanical engagement with the hook whereby release of the attaching device from the snap is positively obstructed until the locking member is manually actuated to remove the obstruction. The snap is self-locking with little effort on the part of the user, is positively locked when in engaged position, and may be released only by manual manipulation.

Another object of my invention is to provide a quick-acting self-locking snap of the character indicated, which is economical to construct and to assemble, reliable and dependable in operation, and comprises a few sturdy parts.

Other advantages inherent in my device will be apparent from the following description and accompanying drawing illustrating my invention.

Referring to the drawing:

Figure 1 is a side elevational view showing my snap device in position to receive the attaching device or ring that is shown in dotted lines;

Fig. 2 is also a side elevational view of my device as it appears when the ring is entering the hook, or being protruded through the mouth of the hook;

Fig. 3 is a similar side elevational view showing my device as it appears when the ring has been received in the hook and has been instrumental in positively locking my snap so that the ring cannot be disengaged therefrom until manual release between the snap and the ring is effected;

Fig. 4 is a front elevational view of the device as shown in Fig. 3;

Fig. 5 is a perspective view of the locking member comprised in the device of Figs. 1, 2, 3, and 4;

Fig. 6 is a plan view partially in section along the line 6—6 of Fig. 3;

Fig. 7 is a side elevational view of a modified form of my snap, the locking member being shown in both solid and dotted lines representing respectively its closed position and its open position;

Fig. 8 is a plan view partially in section taken along the line 8—8 of Fig. 7.

Referring to the drawing, a hook 10 provided with an elongated shank portion 11 is integrally formed with an open frame or loop 12 to which a webbing, strap, rope, or the like 13 is securely fastened. The hook is provided with a recess 14 formed in the shank opposite to the prong 15 of the hook. A member 16 that is U-shaped in section, as shown in Figs. 6 and 8, is pivotally secured at 17 at the base of the shank 11. Thus the U-shaped member 16 embraces or straddles the shank 11 of the hook. One end of a leaf spring 17ª is riveted at 18 to the cross-wall of the U-shaped member at a point adjacent to the prong 15. The free end of the leaf spring slidingly engages the shank 11 in proximity to the pivot 17. The spring 17ª therefore serves to force resiliently the free end of the U-shaped member 16 in contact with the tip of the prong of the hook. Thus, the mouth of the hook is normally closed until the U-shaped member 16 is manually moved about the pivot 17 whereupon the former straddles more completely the shank 11, as shown in Fig. 2.

A saddle 19 is riveted at 20, adjacent to the pivot 17, to the outer face of the cross-wall of the U-shaped member 16. The saddle 19 is formed of spring steel and is provided at its upper end with opposed spaced ears 21 which extend over the two ends of a pin 22 that projects through both legs of the U-shaped member 16. Upon the pin 22 a locking member 23 is loosely hinged. This locking member 23 is shown in perspective in Fig. 5, and is formed in the shape of an H. The pin 22 projects through holes 24 and 24ª formed in the ends 23ᵇ and 23ᶜ of the two legs of the H-shaped member 23 and corresponding holes drilled in the side walls of the member 16. The crossbar of the H-shaped member 23 bridges the U-shaped member 16 at a point centrally of the depth of the latter. When the member 23 occupies locked position, as shown in Fig. 3, the crossbar 25 is received in the slot 14.

In affixing the locking member 23 to the U-shaped member 16, the free end of the saddle 19 is forced away from the cross-wall of the member 16 a sufficient distance to allow the legs of the H-shaped member 23 to be inserted between the ears 21 and 21a and the side walls of the U-shaped member 16. Thereupon the pin 22 is threaded through the holes 24 and the corresponding holes drilled in the side walls of the U-shaped member. The saddle 19 is now released and the ears 21 overlap the two ends of the pin 22 whereby the locking member 23 is loosely but securely hinged to the upper end of the U-shaped member 16. Thus the H-shaped locking member is hinged to the U-shaped member 16 adjacent to the tip of the prong of the hook, and the crossbar 25 is adapted to engage the recess 14 formed in the shank of the hook when the locking member occupies closed position, as shown in Fig. 3.

Operation of my snap will now be explained in connection with the inserting of the ring 26 through the mouth of the hook 10. The ring 26 is brought into contact with the tip of the prong of the hook, as shown in Fig. 1, and the locking member 23 is manually moved to open position shown in Fig. 1. This allows the U-shaped member 16 to be moved manually to the left about the pivot 17 in opposition to the force exerted by the leaf spring 17. The ring 26 is then protruded through the mouth of the hook, as shown in Fig. 2. When the ring passes beyond the tip of the prong of the hook and the upper end of the U-shaped member 16, the operator releases his hold on the latter, whereupon the spring 17a forces the member 16 back to closed position. When this occurs, the crossbar 25 of the locking member 3 is engaged by the ring 26, whereupon the loosely hinged locking member 23 is forced downwardly into horizontal or locked position, as shown in Fig. 3. Thereupon the crossbar 25 straddles the upper edge of the U-shaped member 16 and is received in the recess 14 formed in the shank 11. The free ends of the two legs of the H-shaped member 23 subtend the outer side walls of the U-shaped member, thus restraining lateral movement of the member 23 when in its locked position.

The U-shaped member 16, as long as the ring 26 is received within the hook, cannot be pivotally moved while the locking member 23 occupies closed position, as shown in Fig. 3, because the engagement of the crossbar 25 in the recess 14 precludes the U-shaped member 16 from opening the mouth of the hook until the locking member 23 is moved upwardly, as shown in Figs. 1 and 2, and this upward movement is normally prevented because of the obstruction of the crossbar 25 offered by the ring 26. In view of the foregoing, it is apparent that my snap is positively held in locked position until the locking member 23 is manually moved to disengage the crosspiece 25 from the shank of the hook which cannot occur until the position of the ring 26 within the hook 10 is so manipulated by the operator that the ring does not obstruct the crossbar 25.

All parts of my snap are readily accessible to the operator so that no difficulty will be experienced in releasing the ring 26 from the snap if the operator desires to effect release. Otherwise the snap is permanently attached to the ring 26 until the operator adjusts the ring within the hook so that it will not obstruct movement of the locking member to open position. Under all normal conditions the locking member on moving upwardly will be precluded from disengaging the recess 14 because the ring will obstruct upward movement of the crossbar 25. In order to release the locking member, the ring and the locking member must be both manipulated within the confines of the hook to allow the locking member to be moved to open position without obstruction from the ring. When the locking member 23 is manually moved to the open position, as shown in Fig. 1, the operator can pivotally move the U-shaped member 16 in order to withdraw the ring through the mouth of the hook.

The modified form of my snap which is shown in Figs. 7 and 8 is very similar to the snap previously described, in that it comprises the hook 10 having the shank 11 wherein the recess 14 is formed, the U-shaped member 16a pivoted at 17, and a modified form of locking member 23a including side members 23d and 23e. In this form of my snap, the locking member is normally held in closed position, as shown in Fig. 7, by reason of a coiled spring 26, the movable end 27 of which permanently engages an extension 28 formed on the crossbar 25a of the locking member 23a. The pressure exerted by the spring 26 upon the extension 28 normally forces the locking member into closed position.

In order to insert a ring in the mouth of the hook, the locking member 23a must be manually moved into open position, as shown in the dotted lines of Fig. 7. Thereupon the U-shaped member 16a can be pivotally moved in opposition to the spring 17a in order to protrude the ring through the mouth of the hook. As the ring is received within the hook, the locking member is thereupon manually released and moves to the position shown in the full lines in Fig. 7. The locking member 23a cannot be moved upwardly until the ring is so manipulated as to allow the crosspiece 25a to move without obstruction by the ring to the open position shown in the dotted lines. Here again the snap is quick-acting, is positively locked in closed position as long as the ring occupies normal position within the hook, and the snap cannot be opened to release the ring therefrom until the locking member 23a is manually moved without obstruction by the ring to open position whereupon the U-shaped member 16a can be manually moved to open the mouth of the hook.

While I have shown and described two forms of my invention, it is to be understood that the scope of my invention is not to be restricted except as defined in the appended claims.

I claim:

1. A quick-acting, self-locking snap comprising a hook having an elongated shank and a prong terminating in a tip, a U-shaped latch member receiving said shank in its open face and pivoted at one end to the shank, the other end of said U-shaped latch member defining a receiving space with said hook, resilient means between said shank and the base of said U-shaped latch member for normally forcing the other end of said U-shaped latch member into contact with the tip of said prong to close normally said receiving space, a locking member hinged to said U-shaped latch member adjacent said other end thereof and movable into said receiving space when said U-shaped latch member is pivotally moved toward said shank, and means on said shank engageable by said locking member when adjacent said other end for positively holding said U-shaped latch member against any substantial pivotal movement and substantially in engagement with the tip of the hook.

2. A quick-acting, self-locking snap comprising a hook having an elongated shank and a prong terminating in a tip, a U-shaped latch member receiving said shank in its open face and pivoted at one end to the shank, the other end of said U-shaped latch member defining a receiving space with said hook, resilient means between said shank and the base of said U-shaped latch member for normally forcing the other end of said U-shaped latch member into contact with the tip of said prong to close normally said receiving space, engageable means on said shank, and a locking member pivotally secured to said U-shaped latch member adjacent said other end thereof and movable into said receiving space when said U-shaped latch member is pivotally moved toward said shank, said locking member being operative by insertion of an attaching device into said receiving space to move into its position adjacent said other end of said U-shaped latch member, said locking member when adjacent said other end of said U-shaped latch member being engageable with said engageable means for positively holding said U-shaped latch member against any substantial pivotal movement and substantially in engagement with the tip of the hook.

3. A quick-acting, self-locking snap comprising a hook having an elongated shank and a prong terminating in a tip, a recess being formed in the shank opposite to the prong of the hook, a latch member pivoted at one end to said shank, the other end of said latch member defining a receiving space with said hook, said receiving space being closed by said latch member engaging the tip of the prong of said hook, a spring interposed between the shank and said pivoted latch member urging the latter against the prong, and a locking member hinged to said pivoted latching member adjacent to said prong, said locking member normally lying adjacent the other end of said latch member and being movable into said receiving space when said latch member is pivotally moved toward said shank, and said locking member being positioned to positively engage said shank within said recess when an attaching device is protruded through the mouth of said hook into said receiving space.

4. A quick-acting, self-locking snap comprising a hook having a prong terminating in a tip and an elongated shank wherein a recess is formed opposite to said prong, a U-shaped latch member embracing the shank and pivoted at one end thereto remote from the prong, the other end of said U-shaped latch member defining a receiving space with said hook, said receiving space being closed by said U-shaped latch member engaging the inner face of the tip of said prong, means between said shank and the base of said U-shaped latch member resiliently urging said U-shaped latch member into engagement with said tip, and a locking member bridging said U-shaped latch member and hinged thereto adjacent the end of said prong, said locking member normally lying adjacent the other end of U-shaped latch member and being movable into said receiving space when said U-shaped latch member is pivotally moved toward said shank, and said locking member being positioned to positively engage said shank within said recess when an attaching device is protruded through the mouth of said hook into said receiving space.

5. A quick-acting, self-locking snap comprising a hook having a prong terminating in a tip and an elongated shank wherein a recess is formed opposite to said prong, a U-shaped latch member embracing the shank and pivoted at one end thereto remote from the prong, the other end of said U-shaped latch member defining a receiving space with said hook, said receiving space being closed by said latching member engaging the tip of said prong, an H-shaped locking member bridging said U-shaped latch member and hinged thereto adjacent said prong, said H-shaped locking member having a normal position lying against the other end of said U-shaped latch member and being movable into said receiving space when said U-shaped latch member is pivotally moved toward said shank, the crossbar of said H-shaped locking member being engaged by an attaching device when protruded through the mouth of the hook and into said receiving space to position said locking member in said normal position whereby the crossbar of said locking member is engageable with the shank within said recess to hold said U-shaped latch member against any substantial pivotal movement.

6. A quick-acting, self-locking snap comprising a hook element having a prong terminating in a tip and an elongated shank, a U-shaped member embracing said shank and being pivoted at one of its ends adjacent the base of the shank, the free end of said U-shaped latch member defining a receiving space with said hook, said receiving space being closed by said free end engaging the prong of said hook, means between said shank and the base of said U-shaped latch member urging said U-shaped latch member toward said prong to close normally said receiving space, and a locking member pivotally secured to said U-shaped latch member, engageable means on said shank, said locking member being positively engageable with said engageable means when said locking member is lying adjacent the free end of said U-shaped member, said locking member being urged into said position when an attaching device on being protruded through the mouth of the hook and into said receiving space positively engages said locking member.

7. A quick-acting, self-locking snap comprising a hook having a prong terminating in a tip and an elongated shank wherein a recess is formed opposite to the prong of the hook, a latch member pivoted at one end to said shank, the other end of said latch member defining a receiving space with said hook and being adapted to close said receiving space by engaging the prong of said hook, a spring interposed between said shank and said pivoted latch member urging the latter against the prong, an H-shaped locking member hinged to the free end of said pivoted latch member, said locking member having a normal position lying against the free end of said latch member and being movable into said receiving space when said latch member is pivotally moved toward said shank, the crossbar of said H-shaped member being in the path of an attaching member when received within said receiving space whereby the locking member is urged into its normal position where said crossbar is receivable within said recess when said latch member is pivotally moved toward said shank.

8. A quick-acting, self-locking snap comprising a hook having a prong terminating in a tip and an elongated shank wherein a recess is formed opposite to the prong of the hook, a latch member pivoted at one end to said shank, the other end of said latch member defining a receiving space with said hook and being adapted to close said receiving space by engaging the tip of said prong, a spring interposed between the shank and said pivoted latch member urging the latter against the prong, an H-shaped locking member hinged to the other end of said pivoted latch member, and spring means positively urging the crossbar of said H-shaped member into engagement with the other end of said latch member, said locking member being movable against said spring means into said receiving space when said latch member is pivotally moved toward said shank, the crossbar of the H-shaped member in its position against said other end being receivable within said recess, and said crossbar being obstructed by an attaching member when the latter is received within said receiving space.

9. A quick-acting, self-locking snap comprising a hook having a prong terminating in a tip and an elongated shank wherein a recess is formed opposite to the prong of the hook, a latch member pivoted at one end to said shank, the other end of said latch member defining a receiving space with said hook and being adapted to close said receiving space by engaging the tip of said prong, a spring interposed between the shank and the said pivoted latch member urging the latter against the prong, an H-shaped locking member hinged to said pivoted latch member, said locking member having a normal position lying adjacent the other end of said latch member and being movable into said receiving space when said U-shaped latch member is pivotally moved toward said shank, and spring means resiliently forcing the crossbar of said H-shaped locking member into said normal position, the crossbar of said H-shaped locking member in said normal position being engageable within the recess of said shank thereby locking said latch member against any substantial pivotal movement until said H-shaped member is manually moved into said receiving space.

10. A quick-acting, self-locking snap comprising a hook having an elongated shank and a prong terminating in a tip, a U-shaped latch member receiving said shank in its open face and pivoted at one end to said shank, the other end of said U-shaped latch member defining a receiving space with said hook, resilient means between said shank and the base of said U-shaped latch member for normally forcing said free end of said U-shaped latch member into contact with the tip of said prong to close normally said receiving space, a locking member hinged to said U-shaped latch member adjacent said other end thereof and movable into said receiving space when said U-shaped latch member is pivotally moved toward said shank, and engageable means on said shank, said locking member being adapted to be engaged by an attaching device when protruded through the mouth of the hook whereby said locking member is forced into position adjacent the other end of said U-shaped latch member, in said position said locking member being engageable with said engageable means to rigidly hold said U-shaped latch member against any substantial pivotal movement and in substantial engagement with the tip of the hook.

FRANK G. MANSON.

REFERENCES CITED

The following references are of record in the file of this patent:

UNITED STATES PATENTS

| Number | Name | Date |
|---|---|---|
| 1,457,648 | Bailey | June 5, 1923 |
| 1,626,866 | Neilson | May 3, 1927 |
| 1,879,168 | Freysinger | Sept. 27, 1932 |
| 1,949,608 | Johnson | Mar. 6, 1934 |